(12) United States Patent
Meredith et al.

(10) Patent No.: US 9,111,143 B2
(45) Date of Patent: Aug. 18, 2015

(54) METHOD AND APPARATUS FOR IMAGE COLLECTION AND ANALYSIS

(71) Applicant: AT&T Mobility II, LLC, Atlanta, GA (US)

(72) Inventors: Sheldon Kent Meredith, Marietta, GA (US); Jeremy Fix, Acworth, GA (US); Brandon B Hilliard, Woodstock, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 54 days.

(21) Appl. No.: 14/039,690

(22) Filed: Sep. 27, 2013

(65) Prior Publication Data

US 2015/0092979 A1    Apr. 2, 2015

(51) Int. Cl.
*G06K 9/00* (2006.01)
*G06K 9/22* (2006.01)

(52) U.S. Cl.
CPC ........ *G06K 9/00577* (2013.01); *G06K 9/00496* (2013.01); *G06K 9/22* (2013.01); *G06K 2209/01* (2013.01); *G06K 2209/21* (2013.01)

(58) Field of Classification Search
CPC ........... G06F 7/00; G06F 15/16; G06F 17/00; G06F 17/30; G06F 17/30011; G06F 17/30017; G06F 17/30035; G06F 17/30047; G06F 17/30247; G06F 17/30386; G06F 17/30648; G06F 17/30699; G06F 17/30858; G06F 17/30876; G06F 21/6218; G06F 21/78; G06F 21/80; G06K 9/00; G06K 9/00463; G06K 9/00993; G06K 9/228; G06K 9/34; G06K 9/38; G06K 9/54; G06K 9/60; G06K 9/62; G06K 9/6212; G06K 9/6256; G06K 9/6262; G06K 9/6292; G06K 9/9263; G06K 15/00; H04N 1/00244; H04N 1/00307; H04N 1/00312; H04N 1/2179; H04N 1/2191; H04N 1/32765; H04N 1/32776; H04N 2201/0039; H04N 5/232; H04N 5/28; H04N 5/76; H04N 5/765; H04N 5/77; H04N 5/775; H04N 5/781; H04N 5/9201; H04N 9/7921; H04N 9/8063; H04N 9/8205; H04N 9/8227; H04N 9/877; G07C 5/008; G07C 5/085; G07C 5/0891; G08B 13/19647; G08B 13/19673

See application file for complete search history.

(56) References Cited

U.S. PATENT DOCUMENTS 6,421,080 B1    7/2002   Lambert
7,046,169 B2    5/2006   Bucholz et al.

(Continued)

FOREIGN PATENT DOCUMENTS

EP          2149853 A2     2/2010
WO     WO2012/109753      8/2012

OTHER PUBLICATIONS

Cooper, Cooper, "Automobile Identification using Android," accessed Jun. 26, 2013, http://mobilecps.googlecode.com/svn/trunk/projects/tom_cooper/papers/Thomas_Cooper_paper_v03.pdf.

(Continued)

*Primary Examiner* — Jose Couso
(74) *Attorney, Agent, or Firm* — Guntin & Gust, PLC; Joseph Hrutka

(57) ABSTRACT

A system that incorporates teachings of the subject disclosure may include, for example, a processor that can detect an event, access location information for a group of mobile communication devices that are each automatically capturing images, and identify a subset of the group of mobile communication devices that are in proximity to the event based on the location information. The processor can provide first image analysis criteria to the subset of the group of mobile communication devices without providing the first image analysis criteria to remaining devices of the group of mobile communication devices where the first image analysis criteria includes first characteristics associated with an object. The processor can receive a first target image that includes the object from a first mobile communication device of the subset of the group of mobile communication devices, where the first target image is selected by the first mobile communication device from among a plurality of images captured by the first mobile communication device based on first image pattern recognition performed by the first mobile communication device utilizing the first image analysis criteria. Other embodiments are disclosed.

20 Claims, 7 Drawing Sheets

(56) References Cited

U.S. PATENT DOCUMENTS

| | | | |
|---|---|---|---|
| 7,382,244 | B1 | 6/2008 | Donovan et al. |
| 7,579,965 | B2 | 8/2009 | Bucholz |
| 7,768,548 | B2 * | 8/2010 | Silvernail et al. ............. 348/148 |
| 8,064,379 | B2 | 11/2011 | Huang et al. |
| 8,396,943 | B2 | 3/2013 | Okaya et al. |
| 8,489,987 | B2 * | 7/2013 | Erol et al. ..................... 715/273 |
| 8,510,283 | B2 * | 8/2013 | Hull et al. ..................... 707/706 |
| 2003/0080878 | A1 | 5/2003 | Kirmuss |
| 2003/0095688 | A1 | 5/2003 | Kirmuss |
| 2010/0299021 | A1 | 11/2010 | Jalili |
| 2010/0333194 | A1 | 12/2010 | Ricordi et al. |
| 2012/0270567 | A1 | 10/2012 | Johnson |
| 2013/0018705 | A1 | 1/2013 | Heath et al. |

OTHER PUBLICATIONS

Gordon, et al., Gordon et al., "License Plate Recognition Technology," FBI Law Enforcement Bulletin, 2007, vol. 76.3, pp. 8-13, accessed Jun. 26, 2013, http://www2.cohpa.ucf.edu/crim.jus/documents/WolfLicensePlaterecognitiontechnology.pdf.

* cited by examiner

METHOD AND APPARATUS FOR IMAGE COLLECTION AND ANALYSIS

FIELD OF THE DISCLOSURE

The subject disclosure relates to a method and apparatus for image collection and analysis.

BACKGROUND

Information surrounding an event is often sought after the fact in various situations, such as when a crime has been committed or is ongoing, following a natural disaster, and so forth. Such information can provide answers to causes or contributing factors to the event and, in some instances, can assist in resolving an ongoing event, such as a kidnapping. Eyewitness accounts are often sought for such events but the accuracy of the accounts can sometimes be questionable, particularly where witnesses don't remember what they saw or just weren't paying attention.

BRIEF DESCRIPTION OF THE DRAWINGS

Reference will now be made to the accompanying drawings, which are not necessarily drawn to scale, and wherein.

DETAILED DESCRIPTION

Figure 1:
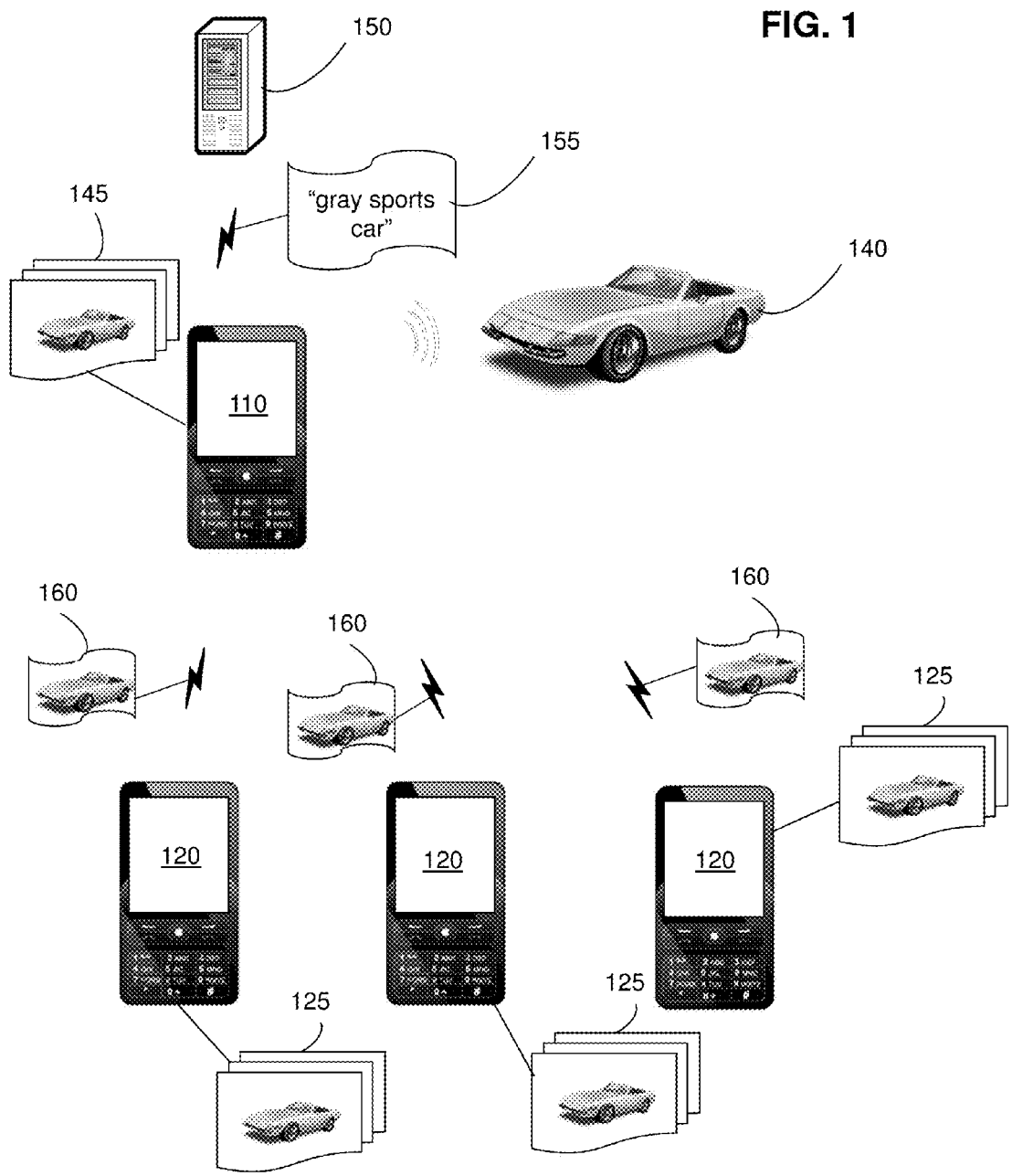
FIGS. 1-2 depict illustrative embodiments of communication systems that provide media services including distributing image content.

The subject disclosure describes, among other things, illustrative embodiments of a method and system for automatically capturing content (e.g., video, still images and/or audio) and analyzing that content to identify whether an event has been captured by the content. The event can be various types of occurrences including crimes, terrorist activity, natural disasters, amber alerts, and can include various types of entities or objects for which information is sought such as a person, a vehicle, a device, and so forth.

In one or more embodiments, the capturing of the content can be performed by a group of devices, such as mobile and/or fixed communication devices, and analysis of the content can be performed by each of the communication devices locally based on search criteria received from a remote server and/or received from other communication devices. In one or more embodiments, the remote server can send the search criteria to a subset of the communication devices based on device location information corresponding to a known or estimated location of the event. The automatic collection and analysis of the captured content can enable law enforcement or other entities to obtain information concerning a particular event, such as in a potential kidnapping where a car is involved and whose whereabouts is being sought.

One or more of the exemplary embodiments can include a mobile device having functionality and/or an application that utilizes existing cameras on mobile phones, that collect (e.g., periodically, continuously, according to a user generated schedule, and so forth) still photographs or video from these cameras and/or audio, and stores the captured content, such as to a buffer. In one or more embodiments, the buffer can have a finite size and can be overwritten when the buffer is full. The automatic content capture allows the owner to review imagery previously collected and also allows software to automatically scan the imagery or audio via image and/or audio pattern recognition to find object(s) of interest that match one or more search criteria (e.g., sample images, sample audio, written description of an object and so forth). In one or more embodiments, the "a priori" collection of imagery or audio allows one to have an automatic capture without needing the user invoke a capture. In one or more embodiments, a user can opt to make this archive part of a search cloud for specified searchers and for a specified time. For example, authorized searchers can provide scan criteria to the mobile device which, in turn, searches through all of the imagery or audio to find matches. Then, matched imagery and/or audio can be sent to the authorized searcher, such as via wireless connectivity. Other embodiments are contemplated by the subject disclosure.

One embodiment of the subject disclosure is a method that includes capturing first images by a first mobile communication device of a group of mobile communication devices, where the capturing is performed automatically by the first mobile communication device subject to recording limitations designated based on user input, and where a second mobile communication device of the group of mobile communication devices automatically captures second images. The method can include receiving, by the first mobile communication device, first image analysis criteria including first characteristics associated with an object, wherein the first image analysis criteria is received from a remote server that provides the first image analysis criteria to a subset of the group of mobile communication devices without providing the first image analysis criteria to remaining devices of the group of mobile communication devices, wherein the subset includes the first and second mobile communication devices. The method can include applying, by the first mobile communication device, image pattern recognition to the first images according to the first image analysis criteria to identify a first target image that includes the object. The method can include determining, by the first mobile communication device, second image analysis criteria from the first target image, wherein the second image analysis criteria includes second characteristics associated with the object. The method can include providing, by the first mobile communication device, the second image analysis criteria to the second mobile communication device to enable the second mobile communication device to perform image pattern recognition on the second images according to the second image analysis criteria to identify a second target image that includes the object.

One embodiment of the subject disclosure is a method that includes detecting, by a system including a processor, an event. The method includes accessing, by the system, location information for a group of mobile communication devices that are each automatically capturing images, and identifying, by the system, a subset of the group of mobile communication devices that are in proximity to the event based on the location information. The method includes providing, by the system, first image analysis criteria to the subset of the group of mobile communication devices without providing the first image analysis criteria to remaining devices of the group of mobile communication devices, where the first image analysis criteria includes first characteristics associated with an object. The method includes receiving, by the system, a first target image that includes the object from a first mobile communication device of the subset of the group of mobile communication devices, where the first target image is selected by the first mobile communication device from among a plurality of images captured by the first mobile communication device based on first image pattern recognition performed by the first mobile communication device utilizing the first image analysis criteria. The method includes determining, by the system, second image analysis criteria from the first target image, wherein the second image analysis criteria includes second characteristics associated with the object. The method includes providing, by the system, the second image analysis criteria to the subset of the group of mobile communication devices to enable the subset of the group of mobile communication devices to perform second image pattern recognition on the images according to the second image analysis criteria to identify a second target image that includes the object.

One embodiment of the subject disclosure includes a computer-readable storage device including computer instructions which, responsive to being executed by a processor of a first mobile communication device, cause the processor to perform operations including capturing first images automatically subject to recording limitations designated based on user input, where the first mobile communication device is of a group of mobile communication devices. The processor can receive first image analysis criteria including first characteristics associated with an object, where the first image analysis criteria comprises text describing the first characteristics associated with the object without providing an image sample of the object, where the first image analysis criteria is received from a remote server that provides the first image analysis criteria to a subset of the group of mobile communication devices without providing the first image analysis criteria to remaining devices of the group of mobile communication devices, and where the subset includes the first mobile communication device. The processor can apply image pattern recognition to the first images according to the first image analysis criteria to identify a first target image that includes the object. The processor can determine second image analysis criteria from the first target image, wherein the second image analysis criteria includes second characteristics associated with the object, where the second image analysis criteria comprises the image sample of the object. The processor can provide the second image analysis criteria to a second mobile communication device to enable the second mobile communication device to perform image pattern recognition on images captured by the second mobile communication device according to the second image analysis criteria to identify a second target image that includes the object.

FIG. 1 depicts an illustrative embodiment of a communication system 100 for delivering or otherwise distributing captured content. The content can be of various formats including still images, video and/or audio content. System 100 can include a group of communication devices including mobile device 110 and mobile devices 120. While the exemplary embodiment is described with respect to a group of mobile devices, it should be understood that one or more of the mobile devices can be fixed devices that are capable of wireless and/or wired communications.

Mobile device 110 can automatically collect content without user intervention. For example, the mobile device 110 can capture images periodically (e.g., an image captured every 2 seconds). Other schedules for capturing content can also be utilized, such as random capturing or at varying intervals. The content is not limited to images, and can include video and/or audio. In this example, mobile device 110 can be in the vicinity of an event 140 which is a sports car driving past the mobile device. Based on the automatic capturing of content, images 145 can be captured where one or more include the event 140. The automatic content capturing can be performed automatically subject to one or more recording limitations. The recording limitations can be designated based on user input and/or determined based on other factors, such as monitored history of usage of the mobile device, user preferences from a user profile associated with the mobile device, subscriber account information, resource capabilities (e.g., monitored battery power), and so forth. The recording limitations can include time limitations, such as start and/or stop times (e.g., a window of time during the day in which capturing is to be automatically performed). The recording limitations can also include storage capacity thresholds (e.g., a maximum amount of storage that is to be utilized by the collected content before overwriting of the collected content commences).

In one embodiment, the recording limitations can be based on detected activity associated with the mobile device 110. For example, the mobile communication device 110 can detect an undesired recording condition and can suspend the capturing of the content during the undesired recording condition. For example, the mobile communication device 110 can detect an undesired recording condition and can suspend the capturing of the content during the undesired recording condition. The undesired recording condition can be lighting conditions, movement of the mobile device 110, an ongoing communication session at the mobile device (e.g., telephone call, internet surfing, video-on-demand playback, and so forth). The detecting of the undesired recording condition can be performed based on various sensors such as a lighting sensor, a movement or orientation sensor (e.g., an accelerometer or gyroscope) and so forth.

In one embodiment, image analysis criteria 155 can be received by the mobile device 110 (and/or one or more of the mobile devices 120) so that mobile device 110 can perform pattern recognition (e.g., image pattern recognition and/or audio pattern recognition on the capture content stored at the memory device. The criteria 155 can be provided to a subset of mobile devices that have been automatically capturing content based on a number of factors. For example, the criteria 155 can be provided to mobile devices that a located in proximity to an event for which content is sought. Other factors, such as device capability, capture schedules of devices and so forth can be used in determining the subset of devices to receive the criteria 155. In one embodiment, the criteria 155 can be transmitted (e.g., via unicast, multicast and/or broadcast) to the subset of mobile devices, which can be any number of devices among the group of devices. The criteria 155 can be in various formats. For example, the criteria 155 can be a description of the event such as "a gray sports car." The criteria 155 can be in other formats, such as a sample image or sample audio. In one embodiment, different criteria 155 can be sent to different devices of the group of devices, such as sending a written description to a first subset of the devices and sending a sample image to a second subset of the devices. The use of different criteria for different devices can be based on various factors such as location of the devices, capabilities of the devices, and so forth.

In the example of system 100, the criteria 155 enables mobile device 110 to perform image pattern recognition on the images 145 to identify one or more target images that have captured the event 140 (i.e., an image of the sports car described in criteria 155). It should be understood that the event 140 can be any type of event capable of being captured in image, video and/or audio content. Based on the identification of the target image that has captured event 140, the mobile device 110 can generate and transmit analysis criteria 160 to one or more other devices, such as mobile devices 120. The criteria 160 enables the mobile devices 120 to perform pattern recognition, such as image pattern recognition, on their own stored collection of captured content 125 to determine if they have any target images that capture the event 140. In this example, each of these other mobile devices 120 may have been in proximity to the event 140 at different times or at the same time. In one embodiment, the mobile device 110 can provide the analysis criteria 160 to the devices 120 without providing the criteria to the remote server 150. In another embodiment, the criteria 160 can be transmitted to the mobile devices 120 via the remote server 150, such as the mobile device 110 first transmitting the criteria 160 back to the remote server so that the remote server can identify the mobile devices 120 (e.g., based on device location information) and can then multicast the criteria 160 to the selected devices 120.

Other techniques for distribution of the criteria for pattern recognition by the subset of devices can also be utilized. For example, a seed query such as "looking for a gray sport car" can be multicast to a subset of mobile devices that have a location within a distance threshold of the event 140. Based on the seed query, the subset of devices (which can include device 110 and devices 120) can simultaneously perform image pattern recognition to identify target images capturing the event 140. In one embodiment, the device 110 and the devices 120 can share their target images amongst themselves for additional pattern recognition against each devices' stored collection of content. Identified target images can then be transmitted back to the remote server 150.

In one or more embodiments, the target images collected from multiple devices of the group of mobile devices can be used for generating a mosaic or composite of the event 140. The mosaic or composite can be in various formats, such as three-dimensional imagery. The mosaic or composite can be generated based on stitching together various forms of content such as image, video and/or audio.

Figure 2:
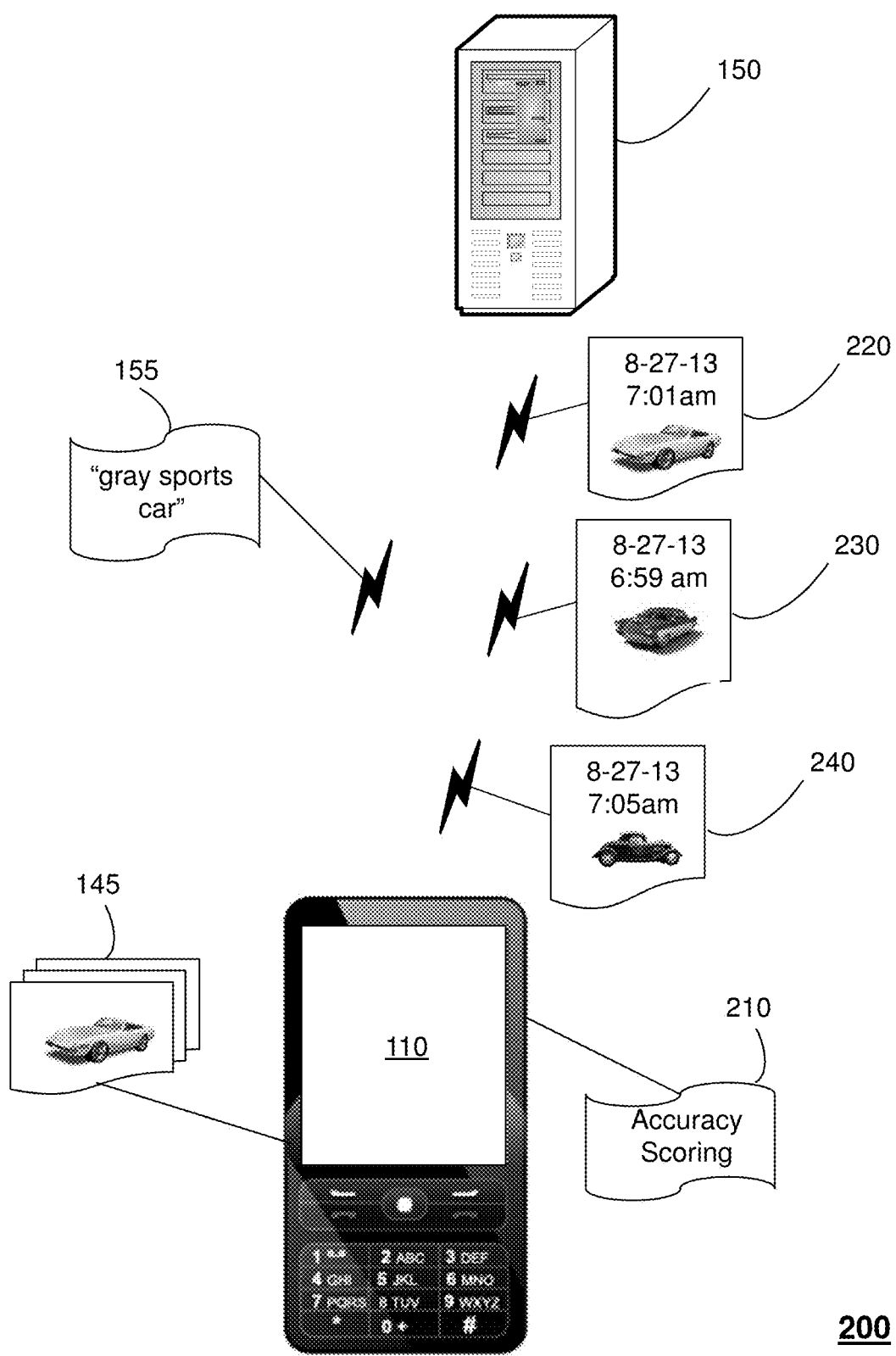

FIG. 2 depicts an illustrative embodiment of a communication system 200 for delivering or otherwise distributing captured content. System 200 can be a part of system 100 or can operate independently of system 100. The content can be of various formats including still images, video and/or audio content. System 200 can include the mobile device 110 which receives the analysis criteria 155 for performing pattern recognition on the stored collection of content 145. As explained above, in this example, the analysis criteria 155 includes a description (e.g., a text-based message) of the event 140, although the analysis criteria can be in other forms such as sample imagery, sample audio, and combinations thereof (including combinations of samples and descriptions). While the exemplary embodiment is described with respect to a mobile device, it should be understood that the mobile device 110 could also be a fixed device that is capable of wireless and/or wired communications. In this example, the content collection 145 is stored in the memory of the mobile device 110, however, other embodiments can store the content collection 145 (or portions thereof) at other locations, such as one or more remote locations (e.g., a digital video recorder).

In one embodiment, archiving of the content collection 145 can be performed, such as when a storage threshold is received, where the archiving includes transmitting archived content to a remote storage location associated with the mobile device 110. In this example, the archived content collection can be retrieved or otherwise accessed by the mobile device 110, such as responsive to receiving the analysis criteria 155, so that the mobile device can perform the pattern recognition. In one or more embodiments, selection of the storage location for the content collection 145 (or a portion thereof) can be based on user preferences or other criteria, such as available storage at particular devices associated with the mobile device 110, proximity to another storage device, whether the storage device is currently in use, and so forth. As an example, a mobile device 110 can automatically capture image content and can archive the image content once the storage threshold for the mobile device 100 has been reached. The storage device for the archiving can be selected based on a proximity of the mobile device 110 to a storage device associated with the mobile device 110 so that short-range communications can be used for archiving of the storage content. For instance, the mobile device 110 can archive collected content to a digital video recorder of a vehicle in which the user of the mobile device 110 is presently riding in response to the storage threshold of the mobile device being reached.

Mobile device 110 can include a scoring application or function 210 that enables the mobile device to generate an accuracy score for target images that were identified from the image collection 145 during the image pattern recognition. This example describes the content as being images, however, the content can be video and/or audio, in which case an accuracy score can also be generated for such identified target content. The accuracy score can be a prediction or other estimate of how well the identified target images satisfy the analysis criteria or otherwise provide the desired results. A number of factors (which can be weighted or considered independently) can be included in determining the accuracy score, such as location information for the mobile device (e.g., images taken closed to the estimated location of the event can be more heavily weighted), type of content (e.g., video can be weighted higher than an image which is weighted higher than audio), quality of content (low resolution or poor lighting conditions can receive a lower weighting), and so forth. In one embodiment, the analysis criteria 155 can include a group of match points and satisfying more of the match points can result in a higher accuracy score. For example, the analysis criteria 155 can be a written description as follows: "a female driving a gray corvette sports car with a tan roof and a blonde girl in the passenger seat." In this example, the written description can be broken up into the following match points: 1) a female driver, 2) a gray car, 3) a sports car, 4) a corvette, 5) a tan roof, 6) a passenger, 7) a girl passenger 8) a blonde girl. Target images identified from the content collection 145 by the mobile device 110 can then be score based on the number of the matching points that are in each of the target images.

The accuracy scoring function 210 can be used to prioritize target images. For instance, an order of transmission of the target images 220, 230, 240 can be selected based on the highest to lowest accuracy scoring. The accuracy scoring function 210 can also be used for prioritizing of other processes. For example, the mobile device 110 can identify target images 220, 230 and 240 and provide an accuracy score for each of these target images. The target images can be distributed to other mobile devices (as analysis criteria) so that the other mobile devices (e.g., devices 120) can perform pattern recognition on their own captured collection of content. The accuracy scorings for each of the target images 220, 230, and 240 can be used by each of the other mobile devices 120 to determine the order in which each target image is going to be used during the image pattern recognition. In one or more embodiments, the identified target content can be different types of content such as an image, a video and audio that are all sent to the remote server 150 based on a prioritized order.

Figure 3:
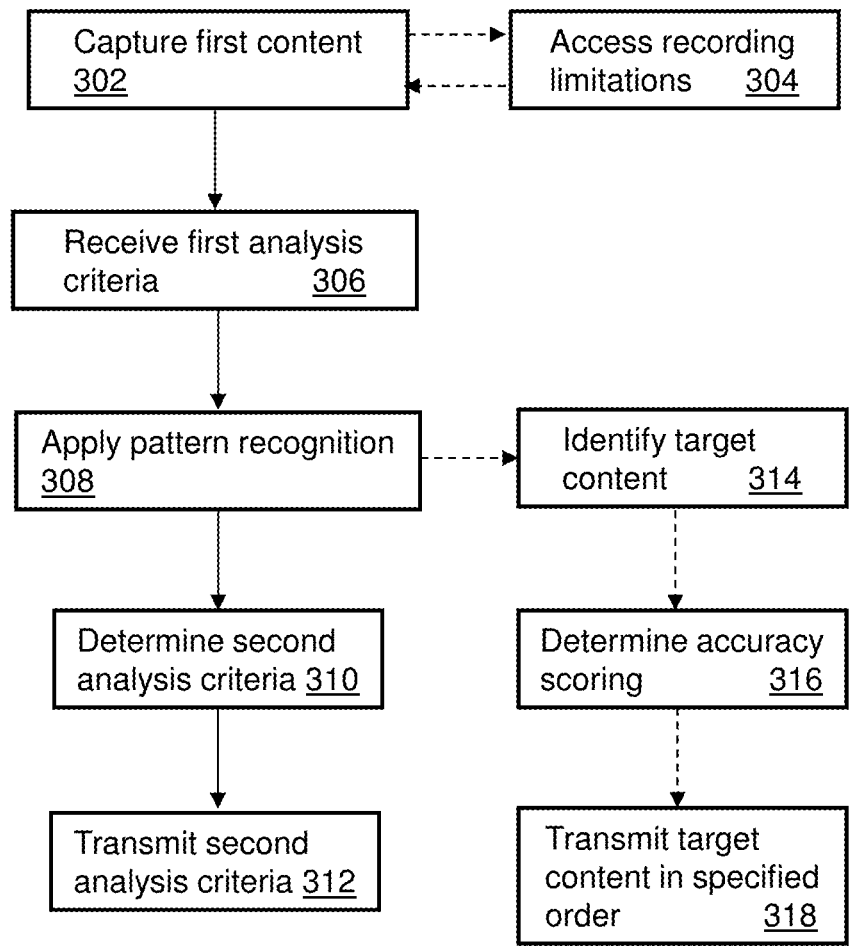
FIG. 3 depicts an illustrative embodiment of a method operating in portions of the systems described in FIGS. 1-2.

FIG. 3 depicts an illustrative method 300 that operates in portions of the devices of FIGS. 1-3. Method 300 can begin with step 302 in which content, such as images, video and/or audio, is captured automatically by one or more communication devices, including mobile and/or fixed devices. The capturing of the content can be performed without the need for user intervention. In one embodiment at 304, the capturing of the content can be performed automatically subject to one or more recording limitations. The recording limitations can be of various types, such as time limitations as to when the capturing is performed (e.g., a start time and stop time during the day), how often to capture content (e.g., number of images per minute), and/or permitted or prohibited locations for capturing content (e.g., authorizing capture outdoors but prohibiting capture in a user's home). The recording limitations can be based on detected activity associated with the mobile device, such as suspending capture during undesired recording conditions such as poor lighting, rapid movement of the device, while particular functions are being performed by the mobile device (e.g., during internet surfing, during a voice call or during resource intensive functions being performed by the mobile device). Some of the recording limitations can be based on a detection of device location, movement or orientation, such as detecting that the device is orientated flatly on a table so capturing images would be futile.

Other recording limitations can be associated with storage of the captured content, such as providing a storage threshold which when satisfied causes commencement of deleting or archiving of the stored captured content. Other recording limitations can be associated with how deleting is to be performed, such as deleting content from oldest to newest, deleting content based on size of the content file, or deleting every other image from the content. Other recording limitations can be associated with how archiving is to be performed, such as removing oldest content and sending to a particular remote storage device. The recording limitations can be based on various factors, such as user input, user preferences (e.g., taken from a device profile or subscriber information), and/or monitored user behavior (e.g., identifying that a user typically saves older images that were manually captured to a personal computer after two days and utilizing that monitored information as a guideline so that once the device memory threshold has been reached or once two days has past, the stored content is removed from the device memory and sent to the personal computer for storage). In one or more embodiments, the recording limitations can be dynamic without user intervention such as changing the rate of automatically capturing images based on a detection of low battery power. In another embodiment, the recording limitations can be adjusted based on information received from a remote source, such as a request to increase the rate of image capture that is multicast or otherwise received by a group of devices from a remote server where the remote server detects that the group of devices are in a geographic zone where a vehicle may be driving through. Such a request can be accepted and performed automatically or can be performed subject to user approval at the particular mobile device.

At 306, first analysis criteria can be received by the one or more communication devices to enable these device to perform pattern recognition on their own stored content to identify any target content that matches or is otherwise relevant to the analysis criteria. The criteria can be in various formats or combination of formats including a description such as a text message, sample image, or sample audio. In one embodiment, different devices can receive different criteria for performing their pattern recognition analysis. The different criteria can be based on different device locations or other factors, such as different device capabilities. As an example, a first set of devices that have captured image content may receive a sample image as the first analysis criteria while a second set of devices that have captured audio recordings may receive a sample audio.

At 308, the one or more communication devices can individually perform pattern recognition analysis on each of their own stored content based on the received first analysis criteria. In one embodiment at 310, at least one of the one or more communication devices can determine a second analysis criteria based on its own pattern recognition analysis. The second analysis criteria can be in various forms including a description, a sample image and/or a sample audio. As an example, a mobile communication device can identify a target image from its own stored content that satisfies the first analysis criteria and can determine the second analysis criteria based on the target image, such as generating a description of the target image or using all or a portion of the target image as a sample image. At 312, the device that has generated the second analysis criteria can distribute the criteria to other devices so that the other devices can perform their own pattern recognition. The distribution of the second analysis criteria can be via a remote server or shared directly between the group of communication devices (e.g., via peer-to-peer communication).

In one embodiment at 314, a plurality of target content can be identified by a communication device based on the analysis criteria. A score can be determined for each piece of target content. The score can be an accuracy score based on a number of factors, such as quality of content, proximity to the event, and so forth. At 318, the target content can be distributed, such as to the remote server or to other mobile devices (as additional analysis criteria), in a distribution order based on the determined score. This example can facilitate more efficiently identifying target content that includes the best depictions of the event by focusing the pattern recognition or other analysis on the content which is estimated to best represent the event.

Upon reviewing the aforementioned embodiments, it would be evident to an artisan with ordinary skill in the art that said embodiments can be modified, reduced, or enhanced without departing from the scope and spirit of the claims described below. For example, the remote server can identify a group of communication devices that are all automatically capturing content and can select a subset of the group based on various factors, such as device location, device capabilities, device storage capacity and so forth. In one or more embodiments, the target images and/or other target content that matches the search criteria can be aggregated to generate a composite or mosaic of the event. In one example, a group of target images from different camera angles can be utilized to generate a three dimensional image of the event. In another embodiment, a two dimensional or three dimensional image that is generated from the target image can be spliced or otherwise integrated with audio target content. Other embodiments are contemplated by the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

The exemplary embodiments can involve software, either as part of a smart phone's operating system or as an add-on application. Such functionality can allow a user to start and stop automatic collection of content, schedule run times, and/or set a maximum amount of memory to be utilized. When collection is occurring, time-stamped captures can fill up the memory allocation until full, after which the functionality can overwrite the memory, such as the oldest captured imagery and/or audio. The application can also allow the user to search back through recorded audio, video, and/or still imagery in order to locate information of interest. This searching can also occur automatically using a set of search criteria presented to the search functionality. This could be manually created by a user or could be downloaded to the mobile device from an authorized agent or party via wireless connectivity. Such search criteria could include license plate information, a description of a vehicle, a photograph, or a sample of audio. In one or more embodiments, the user of the mobile device can enable or otherwise authorize another entity to send search criteria to their device which then uses a similar application to search the archive of audio, video and/or still imagery to find a match. Matched content could be returned to the authorized entity either automatically or only after confirmation by the device owner. Image or audio comparison on a group of mobile device can be performed in parallel with match results sent back to a requestor.

Figure 4:
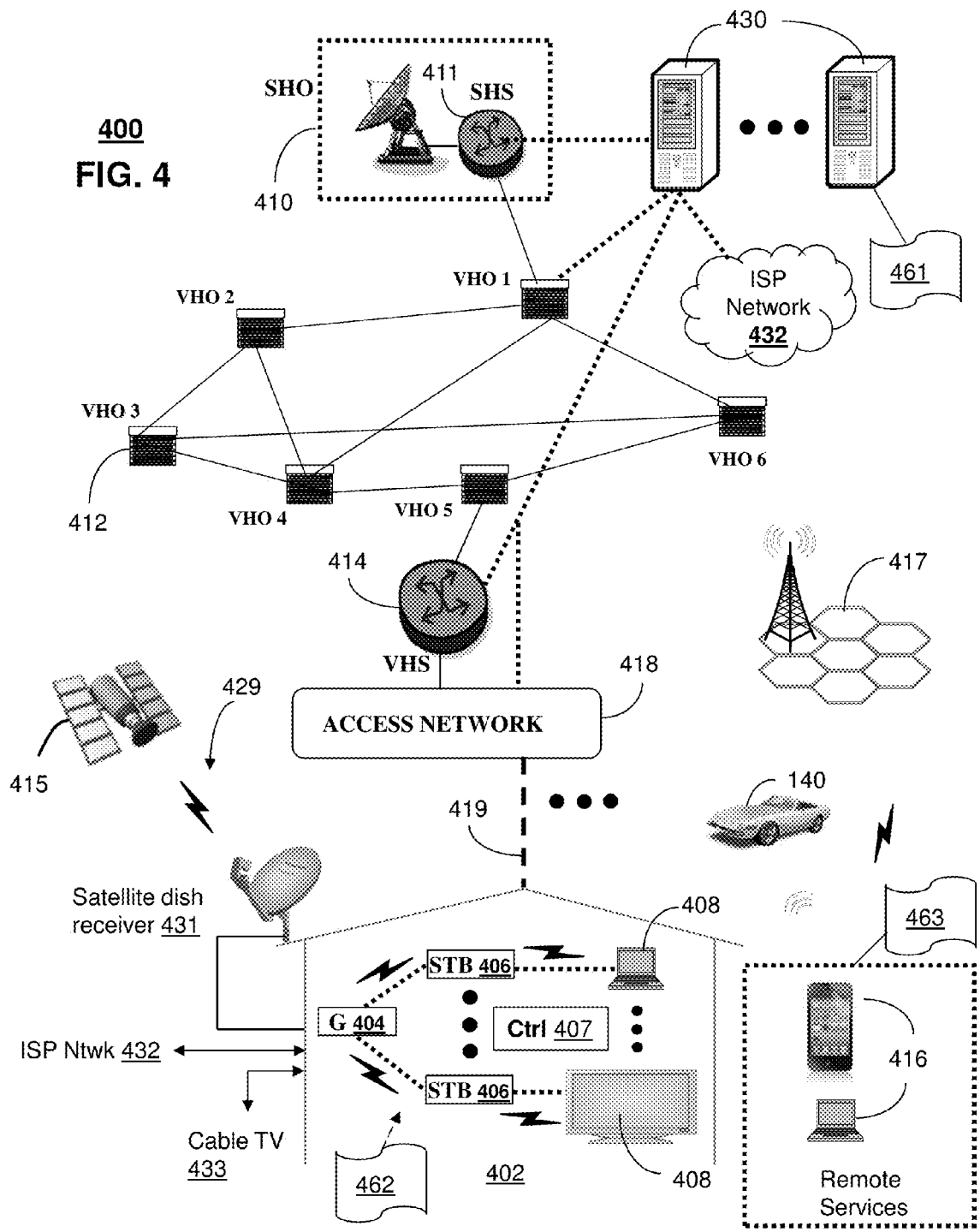
FIGS. 4-5 depict illustrative embodiments of communication systems that provide media services including distributing image content.

FIG. 4 depicts an illustrative embodiment of a communication system 400 for delivering media content and distributing analysis criteria so that automatically captured content can be systematically analyzed based on pattern recognition. System 400 can detect an event, access location information for a group of mobile and/or fixed communication devices that are each automatically capturing images, identify a subset of the group of mobile communication devices that are in proximity to the event based on the location information, and provide first image analysis criteria to the subset of the group of mobile communication devices without providing the first image analysis criteria to remaining devices of the group of mobile communication devices, where the first image analysis criteria includes first characteristics associated with an object. System 400 can also receive a first target image that includes the object from a first mobile communication device of the subset of the group of mobile communication devices, where the first target image is selected by the first mobile communication device from among a plurality of images captured by the first mobile communication device based on first image pattern recognition performed by the first mobile communication device utilizing the first image analysis criteria. System 400 can determine second image analysis criteria from the first target image, where the second image analysis criteria includes second characteristics associated with the object. System 400 can provide the second image analysis criteria to the subset of the group of mobile communication devices to enable the subset of the group of mobile communication devices to perform second image pattern recognition on the images according to the second image analysis criteria to identify a second target image that includes the object.

The communication system 400 can represent an Internet Protocol Television (IPTV) media system. The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

It is contemplated that the subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a remote server for receiving target content that matches search criteria (herein referred to as server 430). The server 430 can use computing and communication technology to perform function 461, which can perform among things, selecting a subset of communication devices to receive content analysis criteria and transmitting the criteria to the subset of devices so that those devices can individually perform pattern recognition on their own automatically stored content. The media processors 406 and wireless communication devices 416 can be provisioned with software functions 462 and 463, respectively, to utilize the services of server 430. Function 462 can include receiving automatically collected content from mobile device 416 for archiving purposes. Function 463 can include automatically capturing content (e.g., image, video and/or audio content) subject to recording limitations and performing pattern recognition analysis based on criteria received from server 430 and/or received from other sources, including other mobile devices.

It is further contemplated that multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies are contemplated by the subject disclosure.

Figure 5:
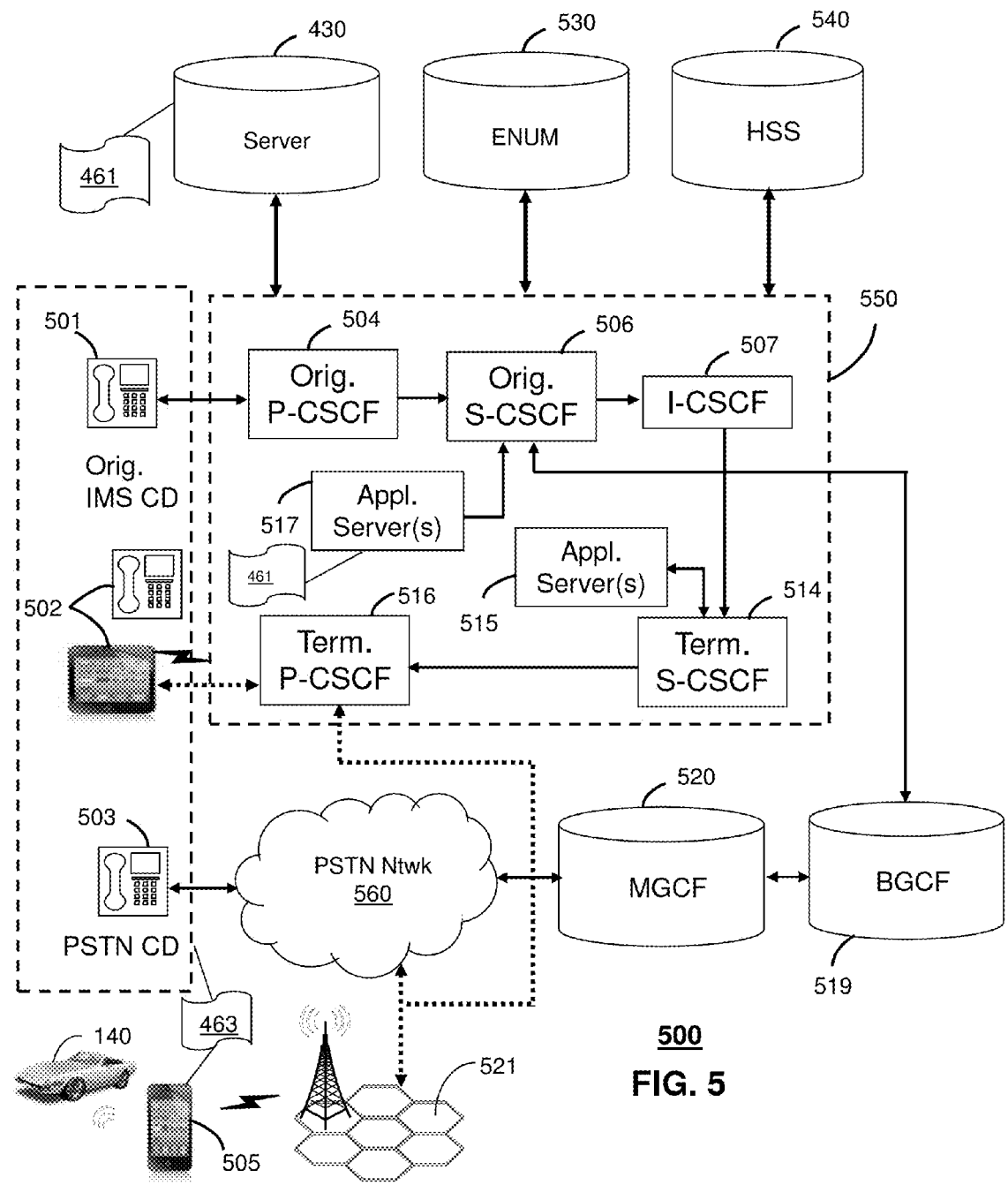

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with communication system 100 as another representative embodiment of communication system 100. System 500 can enable capturing first images automatically subject to recording limitations designated based on user input, where the first mobile communication device is of a group of mobile communication devices. System 500 enables receiving first image analysis criteria including first characteristics associated with an object, wherein the first image analysis criteria comprises text describing the first characteristics associated with the object without providing an image sample of the object, where the first image analysis criteria is received from a remote server that provides the first image analysis criteria to a subset of the group of mobile communication devices without providing the first image analysis criteria to remaining devices of the group of mobile communication devices, wherein the subset includes the first mobile communication device. System 500 enables applying image pattern recognition to the first images according to the first image analysis criteria to identify a first target image that includes the object. System 500 enables determining second image analysis criteria from the first target image, where the second image analysis criteria includes second characteristics associated with the object, and where the second image analysis criteria comprises the image sample of the object. System 500 enables providing the second image analysis criteria to a second mobile communication device to enable the second mobile communication device to perform image pattern recognition on images captured by the second mobile communication device according to the second image analysis criteria to identify a second target image that includes the object.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies are contemplated by the subject disclosure. Accordingly, multiple wireline and wireless communication technologies are contemplated for the CDs of FIG. 5.

It is further contemplated that cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to the second communication system 500 for purposes similar to those described above. It is further contemplated by the subject disclosure that server 430 can perform function 461 and thereby provide analysis criteria services to the CDs 501, 502, 503 and 505 of FIG. 5. CDs 501, 502, 503 and 505, which can be adapted with software to perform function 463 to utilize the services of the widget 430. It is further contemplated that the server 430 can be an integral part of the application server(s) 517 performing function 461.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
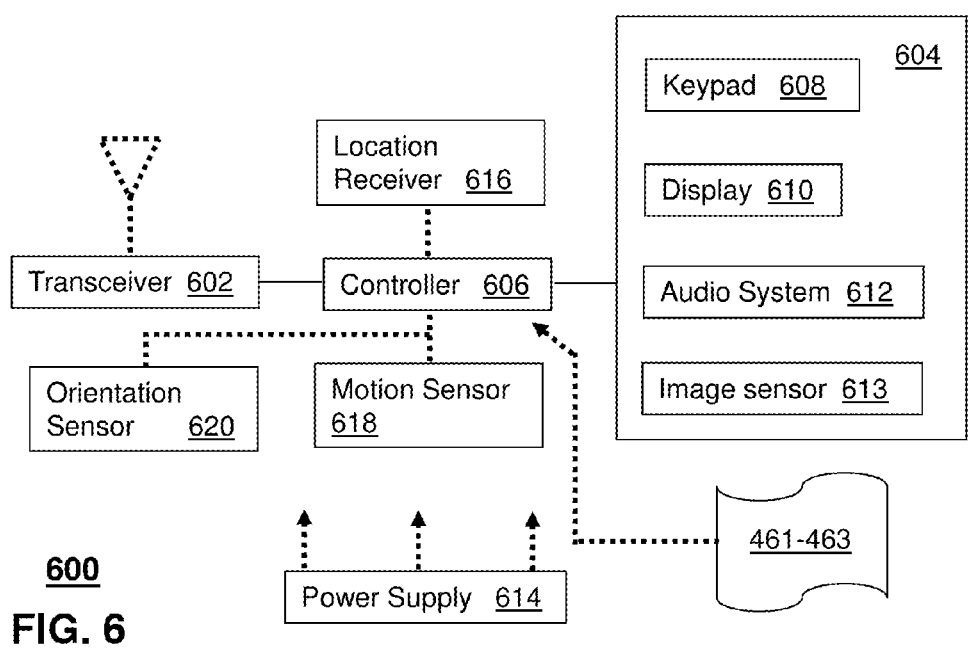
FIG. 6 depicts an illustrative embodiment of a communication device utilized in the communication systems of FIGS. 1-2 and 4-5.

FIG. 6 depicts an illustrative embodiment of a communication device 600. Communication device 600 can serve in whole or in part as an illustrative embodiment of the devices depicted in FIGS. 1-2 and 4-5. In one embodiment, device 600 can capture first images, wherein the capturing is performed automatically by the device subject to recording limitations designated based on user input, where a second mobile communication device of a group of mobile communication devices automatically captures second images. The device 600 can receive first image analysis criteria including first characteristics associated with an object, where the first image analysis criteria is received from a remote server that provides the first image analysis criteria to a subset of the group of mobile communication devices without providing the first image analysis criteria to remaining devices of the group of mobile communication devices, and where the subset includes the first and second mobile communication devices. The device 600 can apply image pattern recognition to the first images according to the first image analysis criteria to identify a first target image that includes the object. The device 600 can determine second image analysis criteria from the first target image, wherein the second image analysis criteria includes second characteristics associated with the object. The device 600 can provide the second image analysis criteria to the second mobile communication device to enable the second mobile communication device to perform image pattern recognition on the second images according to the second image analysis criteria to identify a second target image that includes the object.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input (e.g., touch of a user's finger). As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used control the manipulation of the GUI elements. The display 610 can be an integral part of the housing assembly of the communication device 600 or an independent device communicatively coupled thereto by a tethered wireline interface (such as a cable) or a wireless interface.

The UI 604 can also include an audio system 612 that utilizes common audio technology for conveying low volume audio (such as audio heard only in the proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, the charging system can utilize external power sources such as DC power supplied over a physical interface such as a USB port or other suitable tethering technologies.

The location receiver 616 can utilize common location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 606 can utilize computing technologies such as a microprocessor, a digital signal processor (DSP), and/or a video processor with associated storage memory such as Flash, ROM, RAM, SRAM, DRAM or other storage technologies for executing computer instructions, controlling and processing data supplied by the aforementioned components of the communication device 100.

Other components not shown in FIG. 6 are contemplated by the subject disclosure. For instance, the communication device 600 can include a reset button (not shown). The reset button can be used to reset the controller 606 of the communication device 600. In yet another embodiment, the communication device 600 can also include a factory default setting button positioned below a small hole in a housing assembly of the communication device 600 to force the communication device 600 to re-establish factory settings. In this embodiment, a user can use a protruding object such as a pen or paper clip tip to reach into the hole and depress the default setting button.

The communication device 600 as described herein can operate with more or less components described in FIG. 6 as depicted by the hash lines. These variant embodiments are contemplated by the subject disclosure.

The communication device 600 can be adapted to perform the functions of any of the devices of FIGS. 1-2 and 4-5, including functions 461-463.

Figure 7:
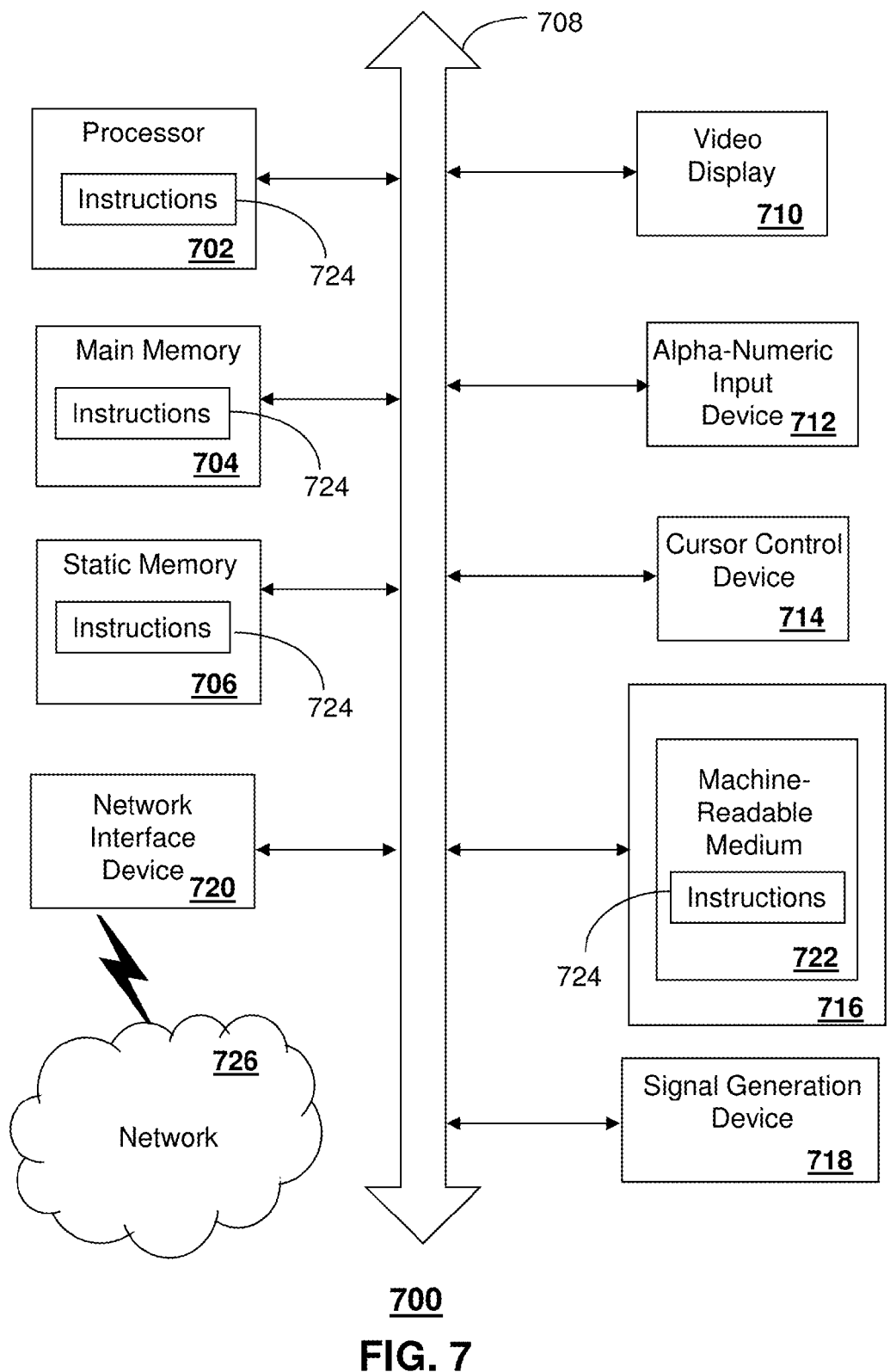
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods discussed above. One or more instances of the machine can operate, for example, as the mobile devices 110 and/or 120 to perform pattern recognition on stored content to identify target content associated with received analysis criteria. One or more instances of the machine can operate, for example, as the remote server 150 or 430 for identifying a group of communication devices that are automatically collecting content, identifying a subset of the devices such as based on device location, and distributing analysis criteria to the subset of devices so that the subset of devices can perform pattern recognition in an effort to capture target content that is associated with an event. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

capturing first images by a first mobile communication device of a group of mobile communication devices, wherein the capturing is performed automatically by the first mobile communication device subject to recording limitations designated based on user input, wherein a second mobile communication device of the group of mobile communication devices automatically captures second images;

receiving, by the first mobile communication device, first image analysis criteria including first characteristics associated with an object, wherein the first image analysis criteria is received from a remote server that provides the first image analysis criteria to a subset of the group of mobile communication devices without providing the first image analysis criteria to remaining devices of the group of mobile communication devices, wherein the subset includes the first and second mobile communication devices;

applying, by the first mobile communication device, image pattern recognition to the first images according to the first image analysis criteria to identify a first target image that includes the object;

determining, by the first mobile communication device, second image analysis criteria from the first target image, wherein the second image analysis criteria includes second characteristics associated with the object; and providing, by the first mobile communication device, the second image analysis criteria to the second mobile communication device to enable the second mobile communication device to perform image pattern recognition on the second images according to the second image analysis criteria to identify a second target image that includes the object, wherein each of the first images is time stamped, wherein the subset of the group of mobile communication devices is selected by the remote server based on location information for each of the subset of the group of mobile communication devices.

2. The method of claim 1, comprising:

storing the first images in a memory of the first mobile communication device; and deleting a portion of the first images from the memory responsive to satisfying a maximum storage threshold defined by the recording limitations, wherein the first image analysis criteria comprises text describing the first characteristics associated with the object, and wherein the second image analysis criteria comprises an image sample of the object.

3. The method of claim 1, wherein the recording limitations include time limitations for the capturing of the first images.

4. The method of claim 1, comprising providing, by the first mobile communication device, the first target image to the remote server.

5. The method of claim 1, comprising:

receiving, by the first mobile communication device, third image analysis criteria including third characteristics associated with the object, wherein the third image analysis criteria is received from the second mobile communication device and is generated based on detection of the third characteristics from the second target image; and applying, by the first mobile communication device, additional image pattern recognition to the first images according to the third image analysis criteria to identify a third target image that includes the object.

6. The method of claim 5, comprising providing, by the first mobile communication device, the third target image to the remote server.

7. The method of claim 1, wherein the first image analysis criteria comprises text describing the first characteristics associated with the object without providing an image sample of the object, and wherein the second image analysis criteria comprises the image sample of the object.

8. The method of claim 1, wherein the providing of the second image analysis criteria comprises transmitting the second image analysis criteria to all other mobile communication devices of the subset of the group of mobile communication devices.

9. The method of claim 1, comprising providing, by the first mobile communication device, a plurality of target images that includes the object to the remote server, wherein an order of providing the plurality of target images to the remote server is based on an accuracy scoring analysis performed by the first mobile communication device.

10. The method of claim 1, comprising:

receiving, by the first mobile communication device, third image analysis criteria including third characteristics associated with the object, wherein the third image analysis criteria is received from the remote server and is generated based on detection of the third characteristics from a plurality of target images received by the remote server from the subset of the group of mobile communication devices; and applying, by the first mobile communication device, additional image pattern recognition to the first images according to the third image analysis criteria to identify a third target image that includes the object.

11. The method of claim 1, comprising:

detecting, by the first mobile communication device, an undesired lighting condition; and suspending the capturing of the first images by the first mobile communication device during the undesired lighting condition.

12. The method of claim 1, wherein the subset of the group of mobile communication devices is selected by the remote server based on device capabilities for each of the subset of the group of mobile communication devices.

13. A method, comprising:

receiving, by a system including a processor, a first target image that includes an object, the first target image being received from a first mobile communication device of a group of mobile communication devices that are automatically capturing images, wherein the first target image is selected by the first mobile communication device from among a plurality of images captured by the first mobile communication device based on first image pattern recognition performed by the first mobile communication device utilizing first image analysis criteria, wherein the first image analysis criteria includes first characteristics associated with the object;

determining, by the system, second image analysis criteria from the first target image, wherein the second image analysis criteria includes second characteristics associated with the object;

providing, by the system, the second image analysis criteria to a subset of the group of mobile communication devices to enable the subset of the group of mobile communication devices to perform second image pattern recognition on the images according to the second image analysis criteria to identify a second target image that includes the object; and detecting, by the system, an event;

accessing, by the system, location information for the group of mobile communication devices; and identifying, by the system, the subset of the group of mobile communication devices that are in proximity to the event based on the location information.

14. The method of claim 13, comprising:

providing, by the system, the first image analysis criteria to the subset of a group of mobile communication devices without providing the first image analysis criteria to remaining devices of the group of mobile communication devices; and receiving, from a second mobile communication device of the subset of the group of mobile communication devices, the second target image.

15. The method of claim 13, wherein the first image analysis criteria comprises text describing the first characteristics associated with the object without providing an image sample of the object.

16. The method of claim 13, further comprising providing, by the system, a time stamp for the first target images, wherein the identifying the subset of the group of mobile communication devices that are in proximity to the event based on the location information is further based on a proximity to a time of the event, and wherein the second image analysis criteria comprises an image sample of the object.

17. A machine-readable storage medium, comprising instructions, wherein responsive to executing the instructions, a processor of a first mobile communication device performs operations comprising:

capturing first images automatically subject to recording limitations designated based on user input, wherein the first mobile communication device is of a group of mobile communication devices;

providing a time stamp for each of the first images, wherein a subset of the group of mobile communication devices is selected based on a timing information for each of the subset of the group of mobile communication devices;

receiving first image analysis criteria including first characteristics associated with an object, wherein the first image analysis criteria comprises text describing the first characteristics associated with the object without providing an image sample of the object, wherein the first image analysis criteria is received from a remote server that provides the first image analysis criteria to a subset of the group of mobile communication devices without providing the first image analysis criteria to remaining devices of the group of mobile communication devices, wherein the subset includes the first mobile communication device;

applying image pattern recognition to the first images according to the first image analysis criteria to identify a first target image that includes the object;

determining second image analysis criteria from the first target image, wherein the second image analysis criteria includes second characteristics associated with the object, wherein the second image analysis criteria comprises the image sample of the object; and providing the second image analysis criteria to a second mobile communication device to enable the second mobile communication device to perform image pattern recognition on images captured by the second mobile communication device according to the second image analysis criteria to identify a second target image that includes the object.

18. The machine-readable storage medium of claim 17, wherein the second image analysis criteria is provided to the second mobile communication device via the remote server that distributes the second image analysis criteria to the subset of the group of mobile communication devices.

19. The machine-readable storage medium of claim 17, wherein the subset of the group of mobile communication devices is selected by the remote server based on user location for each of the subset of the group of mobile communication devices.

20. The machine-readable storage medium of claim 17, wherein the operations further comprise:
   detecting an undesired recording condition; and
   suspending the capturing of the first images during the undesired recording condition.

* * * * *